United States Patent [19]
Piatt et al.

[11] Patent Number: 4,783,669
[45] Date of Patent: Nov. 8, 1988

[54] COMPACT PRINTER WITH CASSETTE-DRAWER SHEET FEEDER

[75] Inventors: Michael J. Piatt, Enon; Scott D. Lehman; Timothy P. Grayson, both of Dayton, all of Ohio

[73] Assignee: Eastman Kodak Company, Rochester, N.Y.

[21] Appl. No.: 20,409

[22] Filed: Mar. 2, 1987

[51] Int. Cl.$^4$ .................... G01D 15/28; G03G 15/00; B65H 1/10

[52] U.S. Cl. .................... 346/134; 355/3 SH; 355/14 SH; 271/160; 400/624

[58] Field of Search .................... 346/134; 355/14 SH, 355/3 SH; 271/145, 160, 161, 162; 400/624, 625, 629

[56] References Cited

U.S. PATENT DOCUMENTS 4,569,587 2/1986 Miyoshi et al. .............. 355/14 SH
4,582,314 4/1986 Yamamoto et al. .............. 271/160
4,698,650 10/1987 Watanabe .............. 346/134

*Primary Examiner*—E. A. Goldberg
*Assistant Examiner*—Mark Reinhart
*Attorney, Agent, or Firm*—John D. Husser

[57] ABSTRACT

A sheet supply station for a compact printer of the type having a housing, a feed/transport member which is rotatably mounted within a forward portion of the housing and is adapted to sequentially move sheets from a supply location at the bottom of the housing, through the print zone and out an egress in the upper surface of the housing. The sheet supply station comprises: (a) a drawer, including a drawer face and a drawer bottom, which is constructed to support a sheet stack and slidably mounted for movement in and out of the rear wall of the printer between a withdrawn position enabling stack insertion and a closed position wherein the drawer face is approximately flush with the rear wall; (b) side guides for engaging and centering a sheet stack, which is supported on the bottom wall, during its movement into the housing from the withdrawn drawer position; and (c) an indexing wall located transverse to the drawer path to accurately position an inserted stack beneath the feed/transport member. Sheet buckling structures are provided for reliably feeding single sheets sequentially from the top of a sheet stack.

21 Claims, 8 Drawing Sheets

COMPACT PRINTER WITH CASSETTE-DRAWER SHEET FEEDER

BACKGROUND OF THE INVENTION

Field of the Invention

The present invention relates to compact line printers having integral sheet feeding capability and more particularly to constructions for receiving and positioning a stack of cut-sheet print media in operative sheet-feed condition within such a printer.

Background Art

With the increasing popularity of "personal" computers and word processors, there has developed a need for similarly "personal" printers of their output. To the extent that the computers and word processors become smaller in size and more portable, there is a commensurate desire that the output printers have the same characteristics. Various small size, dot matrix printers, which are capable of printing on cut-sheet, fanfold and tractor-feed media formats, are available. However, these printers generally require hand-insertion of each successive cut-sheet print medium.

Automatic sheet feeding accessories are available for use with such compact printers, but these devices are separate units from the printer and present several disadvantages. For example, these separate sheet feeders create bulk to the overall system, as well as making it aesthetically unpleasing. The separate feeder approach involves a separate motor, drive transmission and feed elements, causing it to be a costly system addition. Moreover, there must be separate umbilical lines coupling the printer and feeder, and "cords" are always a target for elimination.

From another viewpoint, the add-on sheet feeder approach requires troublesome operator activities when setting up the printing system and when changing between different types of print media, e.g. from discrete sheet to fanfold media. The add-on approach causes complexities in the sheet feed path, which can render the system subject to jams and misfeeds. Also from the functional viewpoint, the add-on approach requires an escape code from the host computer to initiate a sheet feed sequence. The use of this extra code is very inconvenient when utilizing some software packages, e.g. for word processing applications, that do not support such an extra code.

Concurrently filed U.S. application Ser. No. 20,416, entitled "Compact Printer Having An Integral Cut-Sheet Feeder" discloses a printer/feeder which eliminates or significantly reduces such disadvantages of the prior art devices. In general, that printer/feeder provides a transport member which serves to selectively feed face sheets from a supply stack housed within the printer, as well as to transport fed sheets sequentially along a print path including an ingress, print zone and egress. In a preferred embodiment, the transport member comprises a cylindrical platen especially sized and configured to cooperate with sheets and feed paths of predetermined dimension.

SUMMARY OF INVENTION

One significant purpose of the present invention is to provide a sheet handling device which is highly useful for receiving and positioning sheet stacks for the feed/transport systems of printers such as described in the above noted application to enhance those systems' simplicity, reliability and compactness.

Thus, an important objective of the present invention is to provide a compact and mechanically simple device which cooperate in the insertion positioning and feeding of a stack of cut-sheet feed media in a line printer having an integral sheet feed system.

In one aspect the invention constitutes an improved sheet supply station for a compact printer of the type having a housing, a feed/transport member which is rotatably mounted within a forward portion of the housing and is adapted to sequentially move sheets from a supply location at the bottom of the housing, through the print zone and out an egress in the upper surface of the housing. The sheet supply station comprises: (a) drawer means, including a drawer face and a drawer bottom, which is constructed to support a sheet stack and slidably mounted for movement in and out of the rear wall of the printer between a withdrawn position enabling stack insertion and a closed position wherein the drawer face is approximately flush with the rear wall; (b) side guide means for engaging and centering a sheet stack, which is supported on the bottom wall, during its movement into the housing from the withdrawn drawer position; and (c) an indexing wall located transverse to the drawer path to accurately position an inserted stack beneath the feed/transport member.

In related aspects, the present invention constitutes advantageous sheet separating structures for reliably feeding single sheets sequentially from the top of a sheet stack.

BRIEF DESCRIPTION OF DRAWINGS

The subsequent description of preferred embodiments refers to the attached drawings wherein.

DETAILED DESCRIPTION OF PREFERRED EMBODIMENTS

Figure 1:
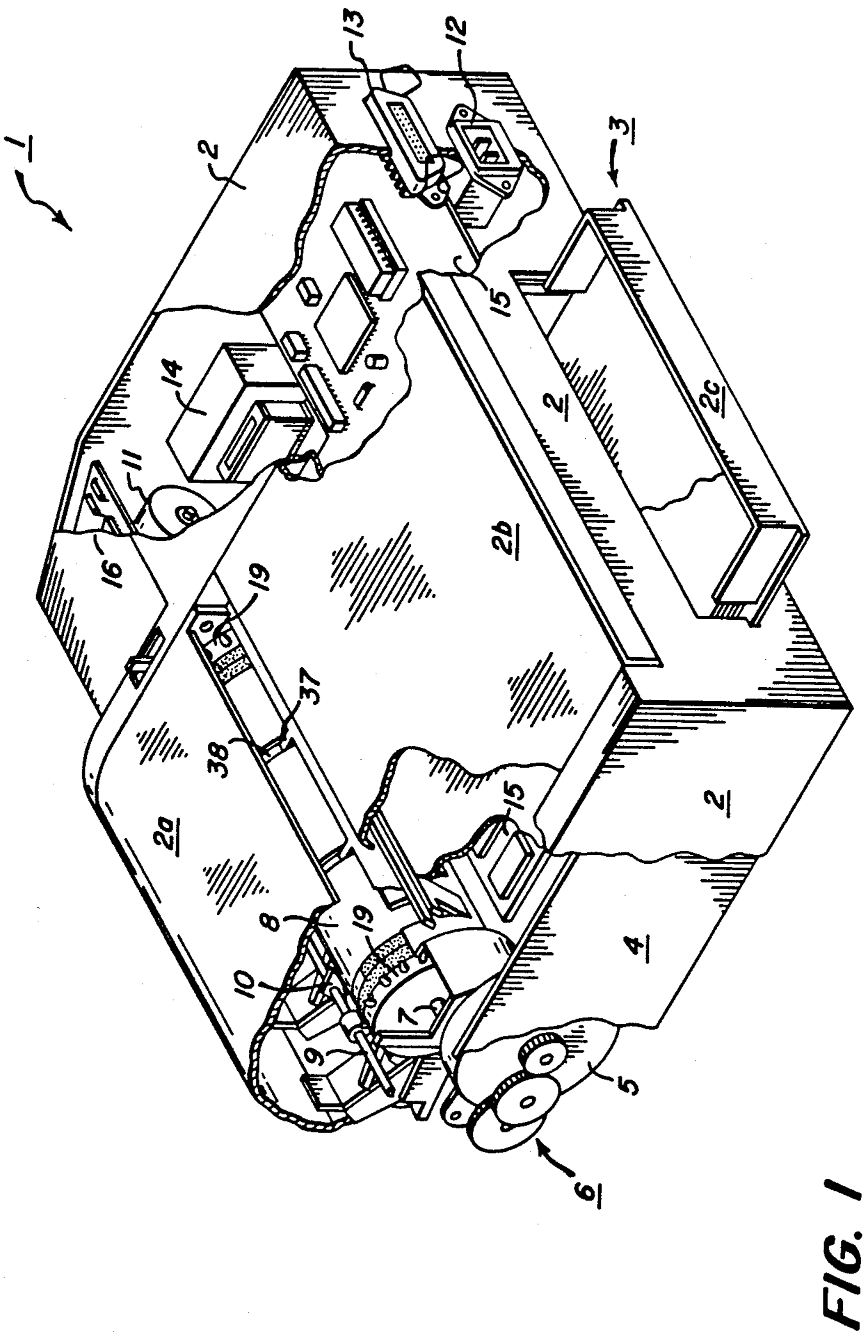
FIG. 1 is a perspective view, with portions broken away, showing one printer embodiment with which the present invention is useful.

The printer 1 shown in FIG. 1 is an embodiment of the present invention employing ink jet printing with insertable, drop-on-demand print/cartridges. While this printing technology is particularly useful for effecting the objects of the present invention, one skilled in the art will appreciate that many of the subsequently described inventive aspects will be useful in compact printers employing other printing approaches. The printer 1 has a housing 2, which encloses the operative printer mechanisms and electronics, and includes a pivotal front lid 2*a*, a pivotal rear lid 2*b* and a rear wall 2*c* of cassette drawer 3. Within the housing 2 is a main frame assembly (one wall 4 shown in FIG. 1) on which various components of the printer are mounted. Thus, a platen drive motor 5 is mounted to impart rotary drive through gear train 6 to a drive shaft 7 for a cylindrical platen 8 constructed in accord with one preferred embodiment of the invention, subsequently explained in more detail. Also mounted on the main frame assembly is a bail assembly 9 which is constructed to cooperate with platen 8 in accord with the present invention, as well as to support a print/cartridge carriage 10, which is shown in more detail in FIG. 2. Also shown in FIG. 1 are the printer's carriage drive motor 11, power and data input terminals 12, 13, power transformer means 14 and logic and control circuitry, which is disposed on one or more circuit boards 15. A control panel 16 for operator interface is disposed on the top front of the print housing.

Figure 2:
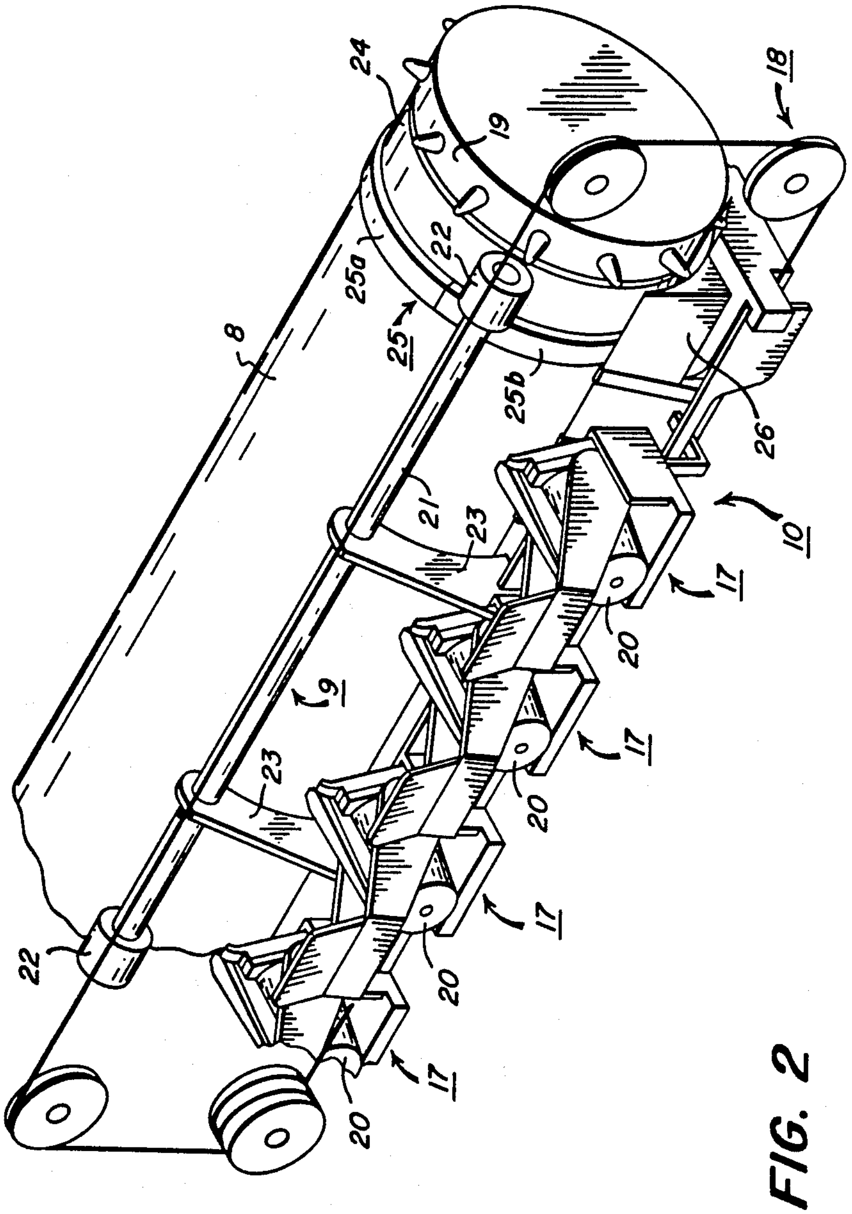
FIG. 2 is a perspective view, compressed in the axial dimension and having other portions exaggerated in scale to illustrate details of the print platen and print head carriage assembly of the FIG. 1 printer.

Referring to FIG. 2, the print/cartridge carriage 10 can be seen to comprise four nests 17 coupled for movement as a unit to translate across respective line segments of a print zone. Each of nests 17 is adapted to insertably receive, position and electrically couple a print/cartridge 20 in an operative condition within the printer. Such print/cartridges can be thermal drop-on-demand units that comprise an ink supply, a driver plate and an orifice array from which ink drops are selectively ejected toward the print zone in accord with data signals, e.g. transmitted through the printer logic from a data terminal such as a word processor unit. Both the print/cartridge construction and the positioning and coupling structures of nests 17 are described in more detail in U.S. application Ser. No. 945,134, filed Dec. 22, 1986, and entitled "Multiple Print/Cartridge Ink Jet Printer Having Accurate Vertical Interpositioning", by Piatt et al, which is incorporated herein by reference. However, other serial printing structures can be usefully employed in combination with the present invention. FIG. 2 also illustrates a carriage drive assembly 18, comprising a cable and pulley loop coupled to the motor 11 and to the carriage 10. Tractor feed wheels 19 mounted on the ends of platen 11 are used to advance tractor feed medium when printer 1 operates in that alternative printing mode.

Considering now the sheet feed constructions in accord with the present invention, the perspective illustration in FIG. 2 shows cooperative platen and carriage structures with non-scale sizes for more clear visualization of significant features. Specifically, platen and carriage assembly features have been axially compressed and the platen end features enlarged to show one preferred embodiment that enables platen rotation to effect the feeding of sheets from a supply stack, as well as transport of a fed sheet along the print path, from an ingress through the print zone and through a printer egress. Thus, the bail assembly 9 includes a shaft 21 which rotatably supports bail pressure rollers 22 near each end of the platen and which slidingly supports guide arms 23. As shown, the guide arms curve around the front platen periphery down into the zone of their attachment with other portions of carriage assembly 10. Axially inwardly from the tractor feed wheels at each end of the platen, there are constructed frictional transport bands 24, e.g. formed of a rubberized coating. Each of bands 24 extends around the entire platen periphery and is of substantially the same diameter as the platen 8. The frictional transport bands are respectively aligned with pressure rollers 22 so as to pinch paper therebetween in a manner that causes transmission of the platen rotation to a print sheet which has passed into their nip. Axially inwardly from each of transport bands 24 the platen comprises raised feed ring portions 25 that extend around the platen periphery. The feed ring portions extend above the platen surface, e.g. about 0.015", and each is divided into a rough surface sector 25*a* and a smooth surface sector 25*b*. The rough sectors of the two feed rings are at corresponding peripheral locations, as are their smooth sectors.

Also shown in FIG. 2 is a lower sheet guide member 26 which extends along the lower periphery of platen 8 from an ingress of the sheet feed path to a location contiguous the lower extensions of guide arms 23. Thus, portions 26 and 23 define means for guiding a fed sheet in close proximity to the platen 8, from the print path ingress into the nip of pressure roller 23.

Figure 3:
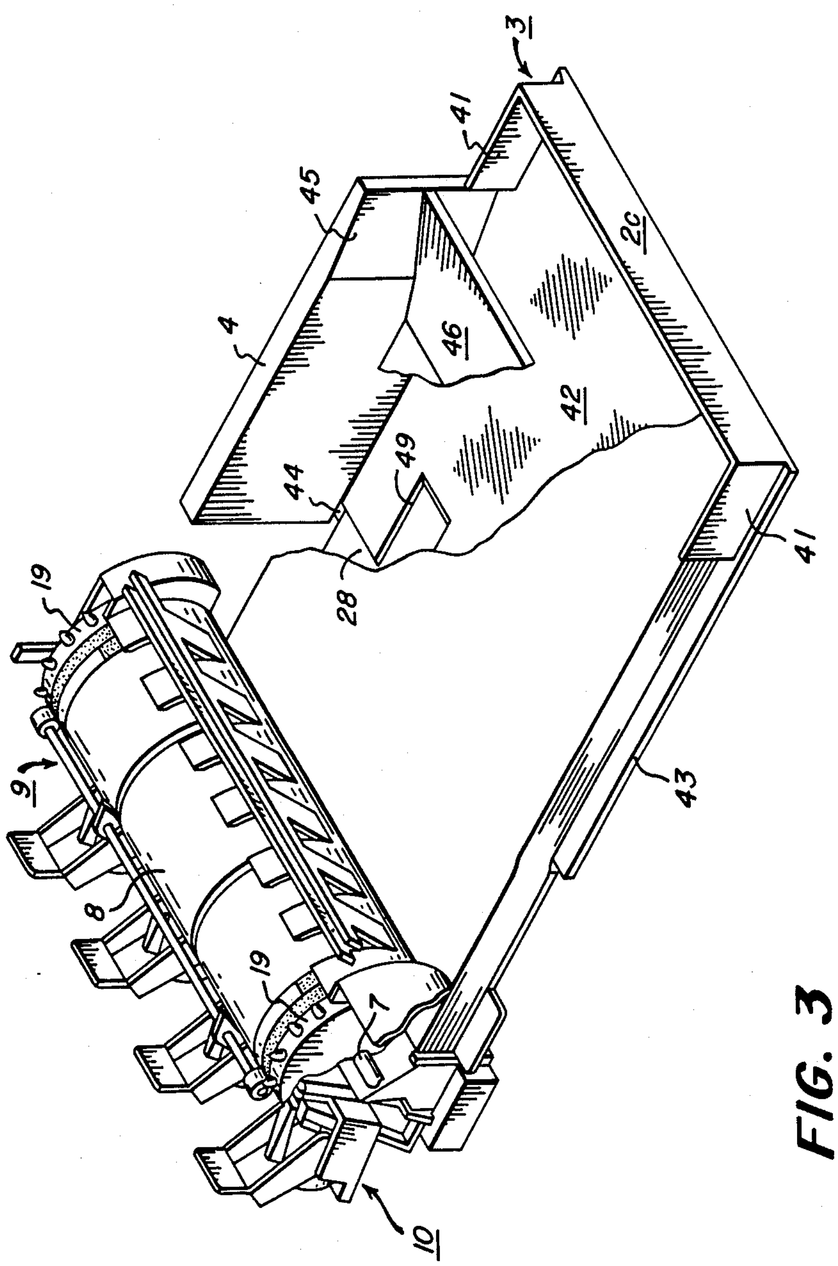
FIG. 3 is a perspective view of FIG. 1 printer portions, with housing removed, and showing one preferred embodiment of the present invention.

Referring back to FIG. 1, it can be seen that the cassette drawer 3 is slidably mounted in the bottom of the printer for movement between a withdrawn location (for the insertion of a stack of print sheets) and a stack positioning location. As shown in FIG. 3, the front end of the stack S positioned by cassette 3 rests on a force plate 28 which is pivotally mounted at its rear end for up-down movement and is biased upwardly by spring means 29. The leading stack edge is indexed against sheet index plate 30 and buckler members 31 (shown in more detail in FIG. 6). The functions of the structural elements described above will be further understood by considering the sheet feeding and printing sequences of the printer 1 with reference to FIGS. 4-A through 4-C. At the stage shown in FIG. 4-A, the platen 8 has been initialized to a start position. (This condition can be readily achieved by various means, e.g. depression of force plate 28, via its tab 28*a*, while indexing the platen to the FIG. 3 orientation by detection of a mark on the platen end by a photodetector not shown.) In this condition the leading edges of the rough surface sectors 25*a* of feed rings 25 are located at the contact point A with the top face sheet of a stack positioned by cassette 3. It is preferred that the contact zone A be located slightly rearwardly from the front edges of the stack, as shown in FIG. 3, to facilitate buckling separation of the top sheet when sheet feed commences.

Figure 4A:
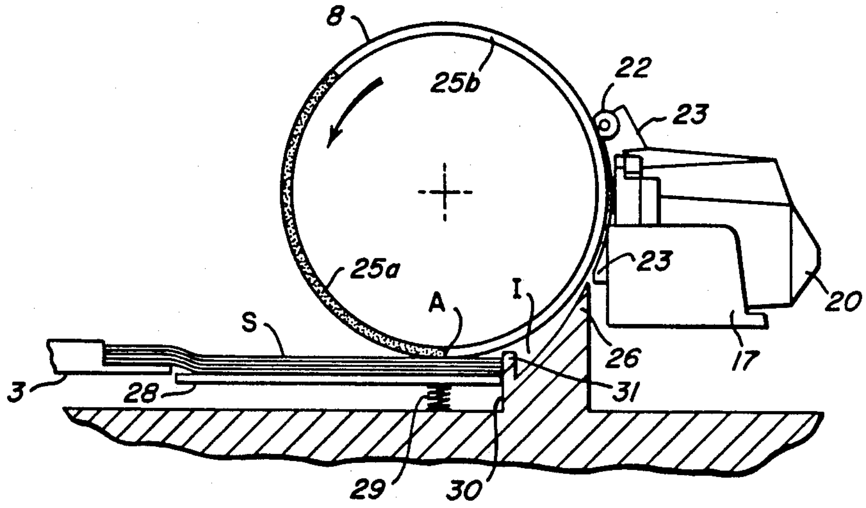
FIGS. 4-A through 4-C are a side view showing details of the sheet feed/transport platen of the FIG. 1 printer and its relation with the sheet supply station.
Figure 4B:
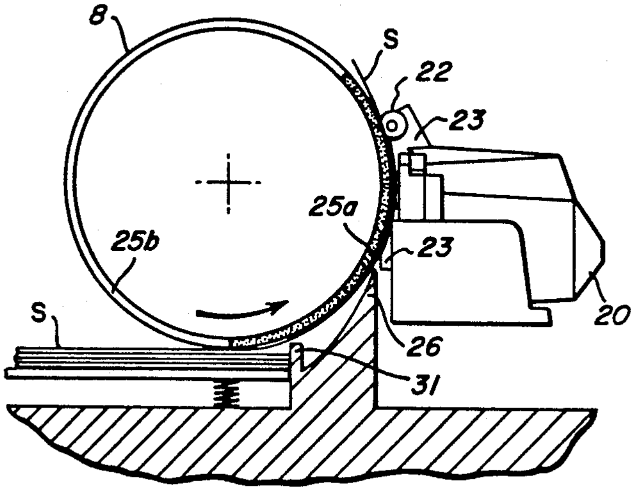
Figure 4C:
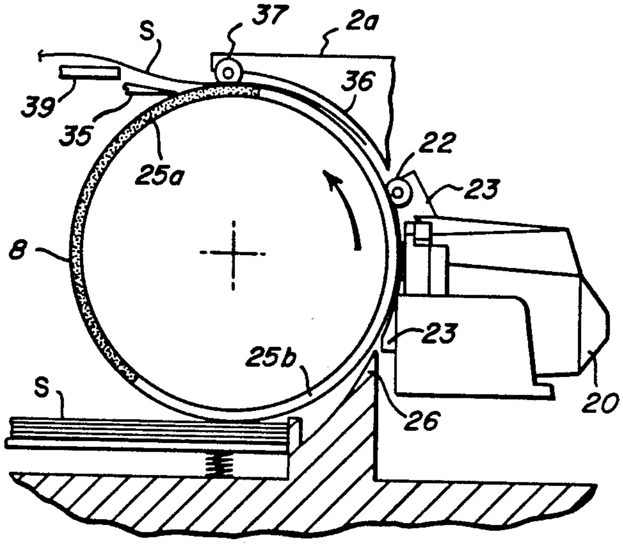

As the platen 8 rotates counterclockwise between the FIG. 4-A and FIG. 4-B conditions, the rough surface portions 25*a* force the top stack sheet into contact with, and over, buckler elements 31, into the print path ingress I. The sequential engagements at contact zone A between successive rough surface portions 25*a* and successive portions of the upwardly biased top sheet S drive the leading sheet edge along the print path defined by the guide means 26, 23 so that the leading edge of the sheet will move into the nip between pressure rollers 22 and transport bands 24. After the leading sheet edge has passed into the nip, the feed by rough surface portions 25*a* is no longer required and, as illustrated in FIG. 4, the smooth portions 25*b* can now exist at the contact zone. Feed of the print sheet continues to be provided by the rotation of the platen, now by virtue of the drive transmission at the nip of roller 22, as successive lines of information are printed by traversing print/cartridges 20.

In the system illustrated in FIGS. 4-A through 4-C, the drum makes two revolutions per sheet and, as shown in FIG. 4-C, toward the end of the second revolution, the trailing edge of a printed sheet S is egressing the nip of roller 22 and smooth portions 25*b* are still passing through the contact zone. Thus, the next successive top sheet is not yet fed from the stack. When the rotation of platen 8 progresses back to the stage shown in FIG. 3 (completing its second revolution), the trailing end of the fed sheet has passed pressure roller 22 and the next sheet feeding and transport sequence is initiated.

Figure 5:
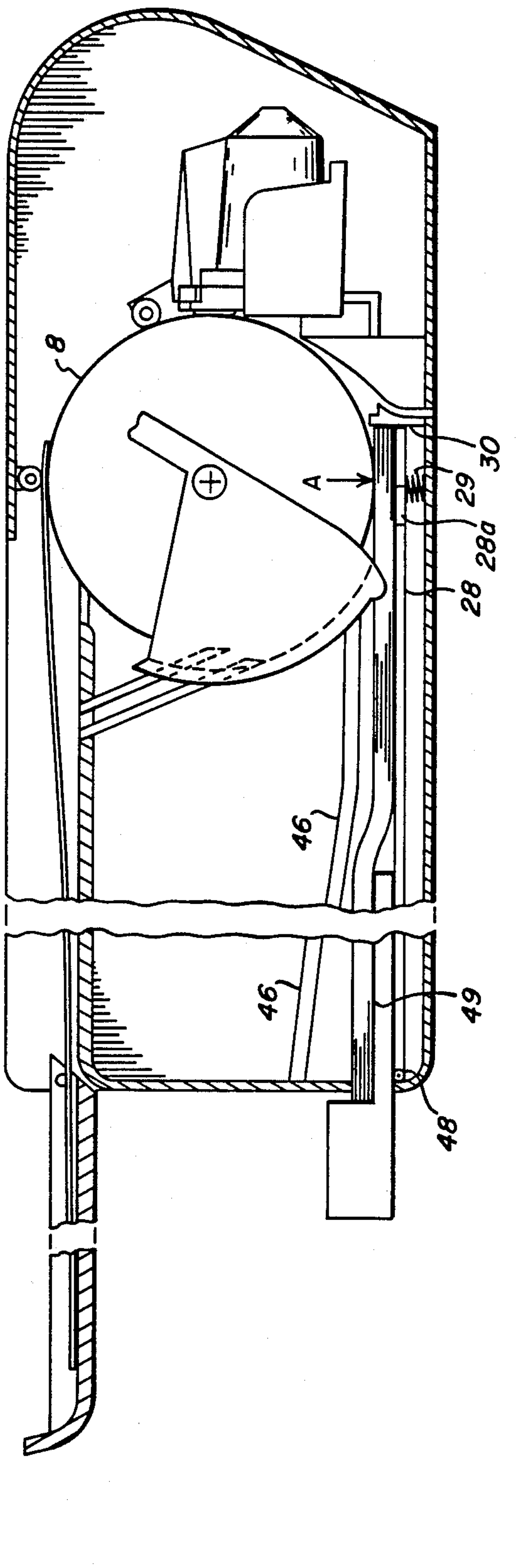
FIG. 5 is a schematic cross-sectional view of the FIG. 1 printer showing further details of the print supply station.

As shown in FIG. 4-C, it is desirable for the housing top to embody guide structure 36 and additional pressure rollers 37, aligned with bands 24 so that a printed sheet is moved completely onto the output tray 39, revealed by opening lid 2*b*. This structure is pivotal away from the drum with front lid 2*a* to allow removal of a printed sheet if a job ceases at the FIG. 5 stage. As shown in FIG. 1 and FIG. 5, stripper fingers 37 are disposed within recesses 38 of platen 8 to assist in directing a sheet into the output tray when a series of sheets are printed successively. Further details of the feeder/transport system described above are set forth in the aforecited Ser. No. 20,416, which is incorporated herein by reference for those teachings. It will be appreciated that such construction provides a compact and mechanically simple system for feeding and transporting sheets in the printer.

Referring now to FIGS. 3 and 5, the structural and functional details of the sheet supply station in accord with the present invention will be described. Thus, cassette drawer 3 includes drawer face 2*c*, partial side walls 41 and bottom wall 42 which are constructed to receive and support the rear sector of a sheet stack for use in the printer. The drawer 3 is supported for sliding movement in the lower rear of the printer housing by the interfitting of the side flanges 43 in grooves 44 of the main frame 4 of the printer. The drawer 3 is movable between three functional positions, viz.: (i) a storage or carrying position wherein face 2*c* is flush with rear wall 2 of the printer, (ii) a stack inserting position, more fully withdrawn than shown in FIGS. 1 and 3 and (iii) a stack indexing position as shown in FIGS. 1, 3 and 5.

Figure 6:
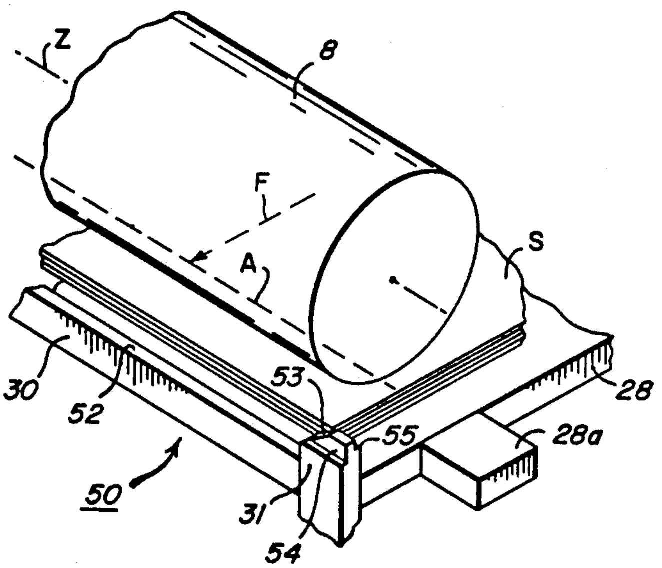
FIGS. 6, 7, 8*a*, 8*b*, 8*c*, and 9 are illustrations showing more detail of the sheet indexing and separating structure of the print supply station.

Referring to FIG. 3, the rear portions of the two side walls (one not shown) of main frame 4 have formed thereon slanted end surfaces 45 which constitute side guides for centering an inserted sheet stack with respect to the feed and transport paths of the printer 1. Above the interior path of cassette drawer 3 is a top guide wall 46 having a downwardly slanted first portion adapted to direct sheet stacks downwardly onto the force plate 28 as they move into their indexed position. As best shown in FIGS. 5 and 6, an index plate 30 is located along the path of an inserted sheet stack, forwardly within the printer of the contact zone A (between the face sheet of an inserted stack and platen 8).

It is preferred that force plate 28 move toward the contact zone A so as to be generally tangential to the periphery of platen 8 at the line of contact between top stack sheets and platen 8. For that purpose the force plate 28 is coupled to the main frame 4 at the rear of the printer by hinge 48. To avoid contact between the upward movement of force plate 28 and the bottom wall 42 of cassette drawer 3, the forward portions of wall 42 have comb-like notches 49 and the rearward portions of the force plate have interfitting notches (not shown).

Considering now the operation of sheet stack insertion, the cassette drawer is first withdrawn to its fully extended position and the front end of a stack (e.g. about 150 sheets of 8½"×11" paper) is inserted into the opening formed by side guides 41 and top guide 46. When the stack has been sufficiently inserted so that its trailing end will rest on bottom wall 42 inside drawer face 2*c*, the cassette drawer 3 is moved to the stack indexing position shown in FIGS. 1, 3 and 5. Thus, drawer wall 2*c* will move the front end of sheet stack S beneath the platen 8 and into abutment with index wall 30. At this stage spring 29 will be urging the top and successive stack sheets into engagement with the periphery of platen 8.

Figure 7:
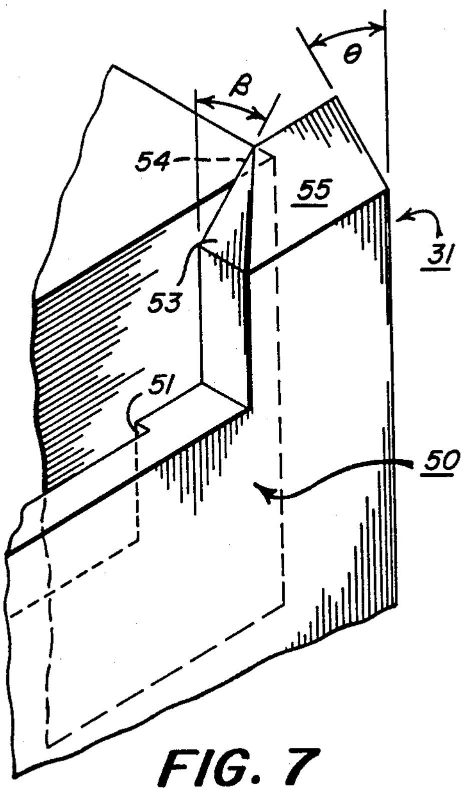
Figure 8A:
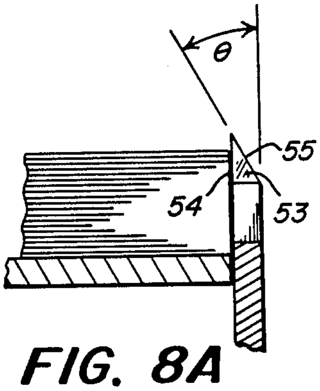
Figure 8C:
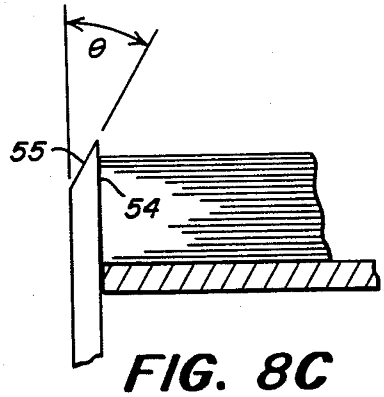
Figure 8B:
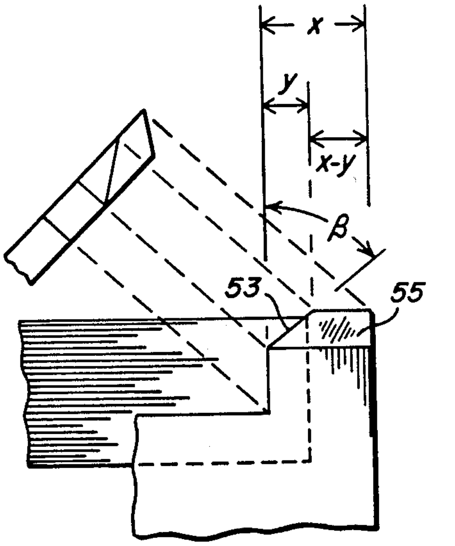

Referring now to FIGS. 6–8, there are shown the details of a particular sheet separator assembly, which has been found particularly useful for effecting the feed of single sheets in cooperation with the supply and feeding systems described above. Thus, the separator assembly comprises a unique sheet buckler configuration that, in combination with the stack positioning means and platen feeder of the printer, performs highly reliable separation of the top sheet from a positioned stack without creating folds in the sheet edges or misalignment of the feed sheet vis-a-vis the printer feed path.

More specifically, FIG. 6 is a perspective view of the sheet feeding and separating assembly from the right front of the printer and FIG. 7 is an enlarged perspective view of the same portion of the sheet indexing and buckler device 50 shown in FIG. 6, but from the left front of the printer. As shown, the device 50 comprises stack index plate 30 which has a cut out portion 51 facing the leading edge of sheet stack S in which is mounted a paper shim plate 52. The shim plate face is located precisely parallel to axis Z of the platen rotation and therefore precisely perpendicular to the direction of feed force F transmitted to the top stack sheet along contact zone A.

Figure 9:
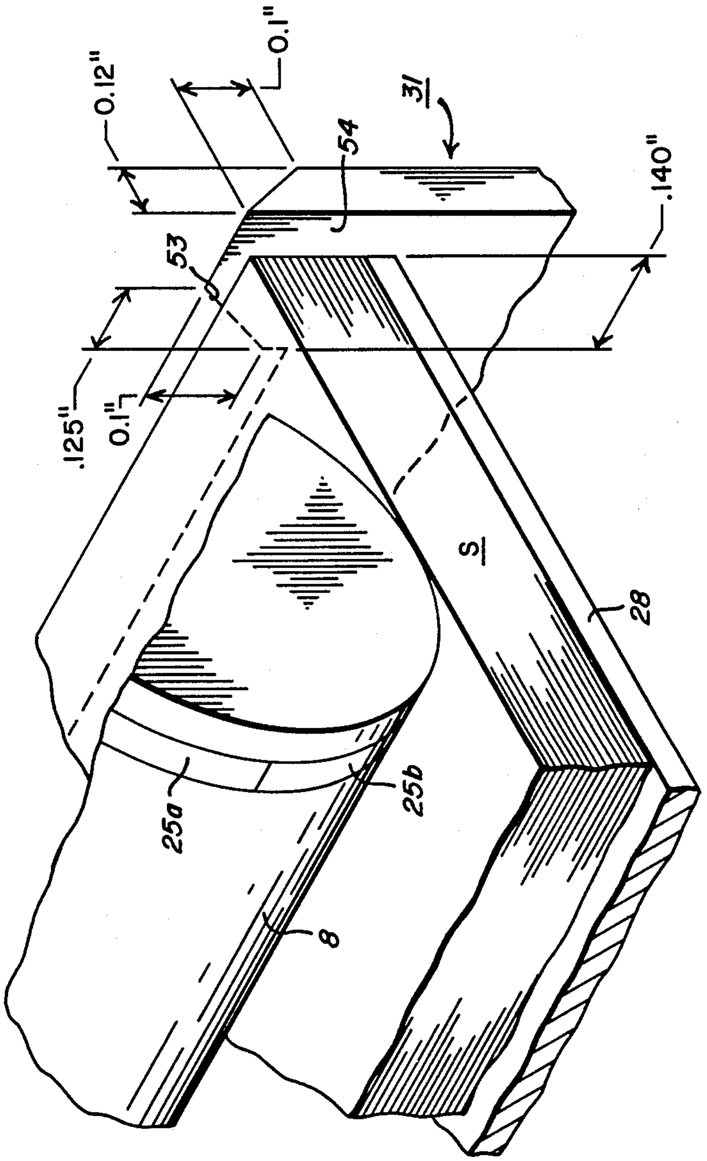

The device 50 also includes two opposing sheet buckler posts 31 located to intercept the outer front edge portions of the sheet stack and define therebetween a sheet feed channel which is narrower that the sheet width. The buckler posts 31 have first bevel surfaces 53 which, as shown in FIGS. 7 and 8-B slope, from bottom to top, outwardly from the sheet feed path (at an angle $\beta$ to a normal from the feed path). Thus, the opposing post 31, which is not shown in the Figures, has a surface 53 that is the mirror image of the illustrated post. As best shown in FIGS. 8-A and 8-C the surfaces 54 of posts 31, which face the sheet stack are precisely parallel to the shim plate 52, while the opposite surface 55 are inclined, from bottom to top, inwardly toward the paper stack at an angle $\theta$. Preferred dimensions of one post embodiment in accord with the present invention are denoted in FIG. 9, and it can be seen that because of the outward (from bottom to top) slant of surface 53, the sheets which are progressively lower in the stack encounter progressively increasing blockage to their movement through the feed channel between the posts. It has been found that this configuration is highly effective to separate a sheet fed from the top of stack S from other stack sheets. Thus, when the friction surface 25*a* of platen 8 moves to the contact zone A, the engaged top sheet is moved toward forward in the direction F with two advantages towards passing the buckle channel (in comparison to lower sheets). First, the top sheet has a larger friction force driving it (i.e. the coefficient of friction between surface 25*a* and the top surface of the top sheet is higher than that between the bottom surface of the top sheet and the top surface of the second top sheet). Second, the top sheet has a wider channel passage because of the bottom-up outward slant of surfaces 53. This combination has been found to reliably cause the top sheet front edge to buckle inwardly and pass through the channel between the posts. The bevel $\theta$ to surfaces 54 are provided to allow the buckled sheet edges to return to a planar condition rather than fold under.

In addition to providing a buckler configuration such as described above, it has been found highly preferred for good sheet separation and feeding that two other system parameters be precisely controlled. First, it is preferred that the two end portions of the fed sheet leading edge contact their respective sheet bucklers substantially simultaneously. Second, it is preferred that the drive force on the top sheet of the stack be directed precisely perpendicular to the line between the buckler elements.

The sheet positioning and feeding structure of the printer embodiments described above are particularly suited for accomplishing these desirable system parameters. For example (in contrast to sheet cassettes that are separate insertable units with built-in buckler structure), the buckler structure of the present invention is integral with the printer and can be precisely located relative to the feed platen axis. Similarly, the stack edge guides and index plate are precisely located relative to the feed platen axis and the buckler structure. Thus a stack of sheets inserted into a printer incorporating the present invention is located precisely by fixed structures, interpositioned with relatively high tolerances and can effect the preferred modes of sheet separation and feed.

In some preferred embodiments of the present invention, it is highly desirable that upper surface portions of the force plate 28 (preferably portions located in opposition to contact zone a) have frictional surfaces to enhance prevention of double sheet feed when the cassette becomes near-empty. It has been found that a frictional surface providing a sheet-surface friction coefficient intermediate the sheet-sheet coefficient and the platen-sheet coefficient is highly preferred. Felt friction pads adhered to the top surface of the force plate below contact zone A work well.

The invention has been described in detail with particular reference to preferred embodiments thereof, but it will be understood that variations and modifications can be effected within the spirit and scope of the invention.

We claim:

1. In a compact printer of the type having: (i) a housing, including top, bottom and side walls, and (ii) a feed/transport member rotatably mounted within said housing and adapted to sequentially move sheets from a supply location proximate the bottom wall of said housing, through a print zone and out an egress in the top wall of said housing, a sheet supply station comprising:

(a) drawer means, including a drawer face and a drawer bottom, constructed to support a sheet stack and being sized and mounted for sliding movement in and out of the rear side wall of said printer between: (i) a withdrawn position enabling stack insertion, (ii) a feed position wherein a sheet stack is positioned for sheet feeding and (iii) a closed position wherein the drawer face is approximately flush with said rear side wall;

(b) side guide means, formed on the interior sides of said housing, for engaging and centering a sheet stack supported on said drawer bottom during drawer means movement into said feed position from said withdrawn position; and (c) an indexing wall coupled to said housing and located transverse to the drawer path to accurately position a supported sheet stack in the proper feed position beneath said feed/transport member.

2. The invention defined in claim 1 further including force plate means, mounted on the bottom wall of said housing for urging the leading portion of a supported sheet stack into engagement with said feed transport member.

3. The invention defined in claim 2 wherein said drawer bottom is constructed to provide access to the leading portion of a supported stack for said force plate means.

4. The invention defined in claim 3 further including top guide means, mounted within said housing above said drawer bottom, for directing a supported stack downward during movement into said feed position from said withdrawn position.

5. The invention defined in claim 1 wherein said indexing wall is located forwardly from the contact point between said feed/transport member and an indexed sheet stack.

6. The invention defined in claim 1 further including edge abutment members coupled to said housing proximate said indexing wall for buckling the side edges of a sheet fed from an indexed stack.

7. The invention defined in claim 6 wherein said indexing wall and said edge abutment members have sheet contact surfaces that are precisely parallel to the axis of rotation of said feed/transport member.

8. The invention defined in claim 6 wherein said edge abutment members comprise spaced post members located at opposite sides of the sheet feed path to define therebetween a channel which is narrower than the fed sheet width.

9. The invention defined in claim 8 wherein said post members bevel surfaces which slope outwardly with respect to the feed path from bottom to top whereby said channel is narrower toward the confronting sheet stack lower portion than to the confronting sheet stack upper portion.

10. The invention defined in claim 9 wherein the surfaces of said post members opposite the sheet stack are beveled from bottom to top toward the stack location to allow return of buckled sheet edges.

11. In a printer of the type having a housing, a feed/transport member rotatably mounted within a portion of said housing and adapted to sequentially move sheets from a supply location at the bottom of said housing, to the print zone of said printer, a sheet supply station comprising:

(a) support means constructed to support a sheet stack at said supply location;

(b) side guide means for engaging and centering a sheet stack supported on said support means;

(c) an indexing wall located transverse to the leading edge of a supported sheet stack beneath said feed/transport member; and (d) edge abutment members proximate said indexing wall for buckling the side edges of a sheet fed from an indexed stack, said edge abutment members comprising spaced post members located at opposite sides of the sheet feed path to define therebetween a channel which is narrower than the fed sheet width;

said indexing wall and said edge abutment members have sheet contact surfaces that are precisely parallel to the axis of rotation of said feed/transport member.

12. The invention defined in claim 11 wherein said post members have bevel surfaces which slope outwardly with respect to the feed path from bottom to top whereby said channel is narrower toward the confronting sheet stack lower portion than to the confronting sheet stack upper portion.

13. The invention defined in claim 12 wherein the surfaces of said post members opposite the sheet stack are beveled from bottom to top toward the stack location to allow return of buckled sheet edges.

14. The invention defined in claim 2 wherein said force plate means comprises a surface having a frictional coefficient with respect to supported sheets that is intermediate the sheet-sheet and feed/transport member-sheet frictional coefficients.

15. In a printer of the type having a housing, including top, bottom and side walls, and a feed roller rotatably mounted within a portion of said housing and adapted to sequentially move sheets from a feed location within said housing, through a print zone of said printer, a sheet supply construction comprising:

(a) drawer means, including a drawer face and a drawer bottom, constructed to support a sheet stack for slidable movement in and out of the rear side wall of said printer;

(b) side guide means coupled to the side walls of said housing for engaging and centering a sheet stack supported on said drawer bottom during drawer movement into said housing; and (c) an indexing wall coupled to said housing and located transverse to the drawer path to accurately position a supported sheet stack in the proper feed location beneath said feed transport member.

16. The invention defined in claim 15 further including top guide means mounted in said housing above said drawer bottom for directing a supported stack downward during movement into said housing.

17. The invention defined in claim 15 further including edge abutment members coupled to said housing proximate said indexing wall for buckling the side edges of a sheet fed from an indexed stack.

18. The invention defined in claim 17 wherein said indexing wall and said edge abutment members have sheet contact surfaces that are precisely parallel to the axis of rotation of said feed roller.

19. The invention defined in claim 18 wherein said edge abutment members comprise spaced post members located at opposite sides of the sheet feed path to define therebetween a channel which is narrower than the fed sheet width.

20. The invention defined in claim 19 wherein said post members have bevel surfaces which slope outwardly with respect to the feed path from bottom to top whereby said channel is narrower toward the confronting sheet stack lower portion than to the confronting sheet stack upper portion.

21. The invention defined in claim 20 wherein the surfaces of said post members opposite the sheet stack are beveled from bottom to top toward the stack location to allow return of buckled sheet edges.

* * * * *